Figure 1:
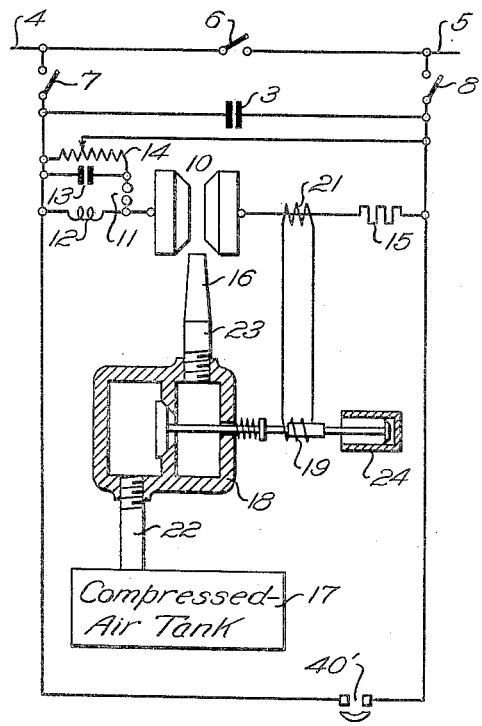

June 20, 1944.   L. R. LUDWIG ET AL   2,351,986

SERIES CAPACITOR PROTECTIVE DEVICE

Filed April 4, 1942

WITNESSES:
Robert O. Baird
Nw. L. Groenur

INVENTORS
Leon R. Ludwig and
Charles V. Fields.
BY O. B. Buchanan
ATTORNEY

Patented June 20, 1944

2,351,986

UNITED STATES PATENT OFFICE 2,351,986

SERIES CAPACITOR PROTECTIVE DEVICE

Leon R. Ludwig, Forest Hills, and Charles V. Fields, East Pittsburgh, Pa., assignors to Westinghouse Electric & Manufacturing Company, East Pittsburgh, Pa., a corporation of Pennsylvania Application April 4, 1942, Serial No. 437,636

9 Claims. (Cl. 175—294)

Our invention relates to protective devices for series capacitors such as are connected in series with an alternating-current line or apparatus. While our invention is of more generic application to any kind of series-capacitor installation, our invention is particularly adapted to the utilization of series capacitors in series with the individual phase-conductors of polyphase electric power-transmitting lines connecting synchronous machines in such manner that stability or power-limits are critical limitations, and where, for these reasons, it is particularly important to utilize high-speed switching on the transmission line, for clearing any fault thereon, and to utilize a capacitor-protecting means which will very quickly restore the capacitor to service, after the clearing of the fault on the line, so that the capacitor will be available to assist in maintaining system-stability during the critical surge-period immediately following the clearing of the fault, when the system is particularly likely to surge itself out of step. The series-capacitor synchronous-line application just referred to constitutes the subject-matter of a copending application of R. D. Evans, R. E. Marbury and A. C. Monteith, Serial No. 445,562, filed June 3, 1942, assigned to the Westinghouse Electric & Manufacturing Company.

Series capacitors, which are connected in series with an alternating-current line or apparatus, need protection in most instances, particularly where the capacitor-voltage is high, and where the short-circuit current of the line or apparatus is more than two or three times the normal full-load current. This is so, because the cost of the series capacitor increases exponentially in accordance with the voltage-level for which its insulation must be designed, and the voltage appearing across a series capacitor, varies, of course, with its current. It is usually economically necessary to provide protective equipment for limiting the amount of voltage which can appear across a series capacitor during fault-conditions, thereby making it possible to design the capacitor at a voltage-level commensurate with the full-load current of the line or apparatus in which the capacitor is connected.

Arcing protective gaps have commonly been utilized, in shunt-circuit relation to series capacitors, for arcing over, and by-passing or short-circuiting the line-current from the series capacitor, in response to excess-voltage conditions across the capacitor. In such protective-arc devices, it is usually quite important for the arc- ing voltage to be low, and for the recovery-voltage to be low, referring to the voltage necessary to restrike the arc after each current-zero. In such arc-devices, there is obviously a problem connected with the extinguishment of the arc after the fault-current condition has passed. If magnetic blowout means were utilized, or even magnetically operated arc-blast means, for extinguishing the arc in the protective gap, there would be the danger, in some cases, of the magnetic force being so strong, by reason of the combination of an excessive magnitude of the fault-current, plus the excessive magnitude of the surge-discharge current of the series-capacitor bank discharging through the gap-device, that premature interruption of the protective arc might result, which would thereupon leave the capacitor in series with the line or apparatus while excessive currents are flowing, in excess of the maximum current which could be permitted to flow, with safety, through the series-capacitor bank, even momentarily. If an air-blast were utilized, it might even be impossible for the protective gap to restrike, while the air-blast is playing, even though the applied voltage might be quite excessive. On the other hand, if the fault-current were of a lower value, there might be danger that the magnetic blowout, or the magnetically operated air-valve, might fail altogether to operate, thus leaving the arc playing continuously across the protective gap, and ruining the gap which is strictly limited in its ampere-second rating.

In accordance with our present invention, we utilize a stable-arc device as the protective gap-device, and we utilize the gap-current to start a timing-sequence controlled by high-speed relays whereby, after a predetermined time, an air-blast is turned on, for blowing out the arc. In some instances, we may provide an undercurrent check-device for making sure that the line-current has returned to normal full-load value, or less, before the air-blast is turned on. Preferably, also, we utilize some sort of backup protection for closing a contactor-switch or circuit-breaker in parallel-circuit relation across both the series-capacitor and the protective-gap device in the event that the gap-current should not be interrupted by the air-blast means within a time which is limited by the thermal capacity of the gap-device. We preferably also utilize means for quickly opening the contactor or circuit-breaker upon the subsidence of the fault-current.

Figure 2:
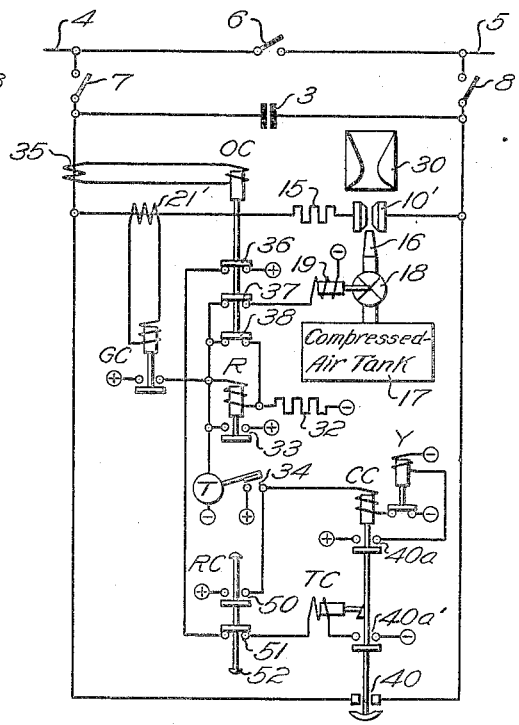

With the foregoing and other objects in view, our invention consists in the apparatus, circuits, combinations, parts and methods hereinafter described and claimed, and illustrated in the accompanying drawing, wherein Figs. 1 and 2 are diagrammatic views of circuits and apparatus illustrating the embodiment of our invention in two different forms of embodiment.

In Fig. 1, we show our invention applied to the protection of a series capacitor 3 which is connected in series with a line 4—5, and which may be isolated from the line by means of disconnect-switches 6, 7 and 8. The series capacitor 3 is shunted by a protective-gap device 10, which preferably has electrodes of tungsten or carbon or other electrode-material which would permit a stable arc to form at the proper overvoltage, the particular gap-device which we have illustrated being a carbon-electrode gap-device which has the property of sublimizing, rather than liquefying, in response to great heat, so that the gap is not ruined by the passage of heavy currents for ten or more cycles, such a gap being described and claimed in the Marbury et al. Patent 2,144,503, granted January 17, 1939.

The gap-device 10 may be arranged with such gap-spacing that it will break down, or arc over, at a predetermined over-voltage against which it is desired to protect the series capacitor 3, or, as set forth in the Marbury Patent 2,072,717, granted March 2, 1937, it may be provided with a pilot-gap or trigger-gap 11, which superimposes a high-frequency surge on the main gap 10, causing the latter to break down when the pilot-gap breaks down. The pilot-gap circuit includes an open-air inductance-coil 12 which is connected in series with the main gap 10, and a capacitor 13 which is energized from an autotransformer 14, the pilot-gap 11 being utilized to connect the inductance 12 and the capacitor 13 in parallel with each other.

The main gap 10 may, or may not, be provided with a suitable impedance-device for limiting the current-surge which is produced by the short-circuiting of the main capacitor-bank 3 when the gap 10 breaks down, and for this purpose I have illustrated the main gap-circuit as including a small surge-limiting resistor 15.

When the time comes to restore the series-capacitor 3 to service, after it has been by-passed by the gap-device 10, we extinguish the arc in the gap-device 10 by blowing a strong blast of air across its arcing-space, which we accomplish by providing a nozzle 16, which receives air from a compressed-air tank 17, under the control of a normally closed valve 18, which is electrically operated by means of a solenoid 19, which is illustrated, in Fig. 1, as being energized from the gap-current, as by means of a gap-circuit current-transformer 21. If the compressed-air tank 17 is not too far away from the power-gap 10, and if the piping 22—23 from the tank to the nozzle 16 is fairly straight, it will be possible to get the valve 18 open, and the compressed air up through the piping to the nozzle 16 and out across the arcing surfaces of the gap-device 10, within five to eight cycles, or even less (on the basis of a 60-cycle line), after the beginning of current-flow in the gap-circuit.

This inherent time-delay, in the bringing of the air-blast into play across the arcing terminals of the gap-device 10, may be relied upon as the sole means for predetermining the length of time during which the arc will be permitted to play across the power-gap device 10, it being understood that this time must be sufficiently long for the fault-responsive line-switching devices (not shown) to clear the fault from the line 4—5 before the arc is extinguished in the protective gap-device 10. If desired, however, the operating-time can be adjusted to any desired predetermined value by means of any of the many known time-controlling means which are available, as symbolically indicated by means of a dashpot 24 in Fig. 1; or undercurrent interlocking means may be provided, as shown in Fig. 2, for making sure that the fault-current conditions have passed, before permitting the air-blast to be applied.

In Fig. 2, we show a form of embodiment of our invention in which the main arc-device 10' is provided with an arc-chute 30, which is diagrammatically indicated in Fig. 2, and the air-blast is utilized to blow the arc out of the arcing space between the two electrodes of the main gap-device 10', and into an adjoining arc-interrupter or arc-chute 30 where the arc may be easily quenched.

In Fig. 2, we provide a gap-current relay GC which is energized in response to the current flowing in the gap-circuit 10', as by means of a current-transformer 21', and we utilize this gap-current relay GC to set in operation a train of events which will result in the extinguishing of the arc in the main gap-device 10'. In the illustrated form of embodiment, in Fig. 2, the gap-current relay GC is utilized to immediately energize an auxiliary relay R, through a resistance 32, and also a timer T, from a suitable direct-current source which is indicated by the terminals (+) and (—). The relay R thereupon picks up, and seals itself in, through an auxiliary make-contact 33. The timer T begins to operate, and will close its contact 34 in 6 cycles, or other time-setting.

In Fig. 2, we also provide an overcurrent relay OC, which is energized in accordance with the line-current, as by means of a current-transformer 35. The overcurrent relay OC picks up at the same time as the gap-current relay GC, and instantly opens its three overcurrent back-contacts 36, 37 and 38, getting these contacts open before the GC relay closes its single make-contact, which is sufficiently identified by reference to the GC designation. The GC contact, and the R-relay contact 33, in parallel, are utilized, in series with the overcurrent back-contact 37, to energize the solenoid-coil 19 of the air-valve 18 as soon as the current subsides, from fault-magnitude, to a magnitude very slightly above the full-load current, thereupon quickly turning on the air-blast and extinguishing the arc in the main protective device 10' by blowing the arc out into the arc-chute or interrupter 30.

When the fault-current subsides and the overcurrent relay OC drops out, its back-contact 38 short circuits the operating-coil of the auxiliary relay R, thereby causing the latter to drop out, opening its holding contact 33, but not until the solenoid-operated valve 18 has been opened.

If, however, the fault-current should persist, so that the air-blast is not turned on within the time-setting of the timer T, which may be 6 cycles, or other time determined by the thermal rating of the main-gap device 10', the timer-contact 34 closes, and energizes the closing coil CC of a circuit-breaker 40 which thereupon closes its main contacts 40 which are connected in a shunting circuit around both the series-capacitor 3 and the main arc-device 10'. The total time of the timer T and the time required for the closing operation of the breaker 40 must be within the thermal ampere-second rating of the main gap-device 10' for the maximum fault-current magnitude which is to be expected. The closing of the breaker-contacts 40 deenergizes the arc in the main gap-device 10', thus causing the arc to be extinguished and releasing the gap-current relay GC, which thereupon drops out and releases the auxiliary relay R and the timer T, resetting the same. To prevent unnecessary overheating of the closing coil CC, the latter is usually connected in series with the back-contacts of a cutoff-relay Y, the operating coil of which is energized from an auxiliary switch 40a which closes when the circuit-breaker 40 closes.

The circuit-breaker 40 remains closed until the line-current subsides to substantially full-load value, whereupon the overcurrent relay OC drops out and closes its back-contact 36, which energizes the trip-coil TC of the circuit-breaker 40, the tripping circuit being completed through an auxiliary breaker-switch 40a' which is closed when the breaker is closed and which opens when the breaker opens.

The operation of both Figs. 1 and 2 may now be briefly reviewed. In both figures, the series-capacitor bank 3 remains shorted out of service as long as the main arc-device 10 or 10' is arcing, and this time is controlled by the time required to get the air-blast across the arcing-space, so as to extinguish the arc. The carbon-electrode gap-device 10 or 10' has such a low arcing-voltage, and such a low recovery-voltage, that it not only constitutes practically a short-circuit on the capacitor-bank 3, while the arc is in operation, but the arc restrikes very promptly after each current-zero, as long as the arc is not extinguishes by the turning on of the air-blast.

In Fig. 1, the arcing over of the main gap-device 10 initiates a flow of current in the gap-circuit, which is utilized to energize the electric solenoid-valve 19—18. The nature of the piping 22—23 which is utilized to feed compressed air to the nozzle 16, and the spacing of the nozzle 16 from the main-gap device 10, determine the time required to get the air-blast across the main gap-device 10, and insure that this time shall be longer than the time during which current of fault-magnitude will ever flow in the line 4—5 in which the series-capacitor 3 is connected. This predetermined time may be built directly in the apparatus, as just stated, or if some local or field-adjustment of the time is desirable, a dashpot 24 may be provided, as indicated.

In Fig. 1, it is contemplated that some sort of auxiliary protective contactor or circuit-breaker 40' shall be provided, as is diagrammatically indicated in the figure, the details of control of this protective contactor or circuit breaker 40' being omitted in Fig. 1, other than to indicate that the contacts are normally open, and connected in shunt-circuit relation to both the main series capacitor-bank 3 and the main gap-device 10. In Fig. 1, this auxiliary contactor or circuit-breaker 40' may be closed, either manually or otherwise, in the event of a defect in the apparatus or in the event of a necessity for performing a service or maintenance-operation on the equipment.

In Fig. 2, instead of building a predetermined time-delay into the air-blast apparatus, so that the air-blast is automatically turned on, within such predetermined time-period, without waiting to check on the subsidence of the fault-current, we provide means for first checking, to be absolutely sure that the fault-current has subsided, before permitting the electric solenoid-valve 19—18 to be energized, and thereafter, the time of getting the air-blast across the electrode-surfaces of the main gap-device 10' is made as short as can conveniently or economically be devised, within the apparatus-limitations. This check, to make sure that the fault-current has subsided, is provided, in Fig. 2, by means of the back-contact 37 of the overcurrent relay OC.

In Fig. 2, also, we provide means for closing the protective circuit-breaker 40 at the end of a predetermined time-interval, if the gap-arc has not been extinguished in the meantime. This function is accomplished by means of the timing relay T. As long as current is flowing in the main gap-device 10', the gap-current relay GC remains actuated, energizing the timer T, which requires a certain predetermined time, which may be something like six cycles, more or less, after which time the timer T closes its contacts. If the gap-arc is extinguished before the expiration of the time for which the timer T is set, the gap-current relay GC will drop out and the timer T will reset itself for a new operation. If, however, the arc in the gap-device 10' is not extinguished by the expiration of the time for which the timer T is set, the timer-contact will directly energize the closing coil CC of the breaker 40 and bring about a closing-operation of the breaker, which will be completed in some one and one-half to four or more cycles after the closing of the timer-contacts 34.

In Fig. 2, also, we provide means for immediately and quickly reopening the circuit-breaker 40 as soon as the fault-current subsides, a function which we accomplish by means of the back-contacts 36 of the overcurrent relay OC, in series with the auxiliary breaker-switch 40a'.

In Fig. 2, also, we have made a diagrammatic showing of a remote-control device, which we have indicated schematically by means of a two-position switch RC, having a make-contact 50, a break-contact 51, and one or more handles 52. When the automatic operation of the device, as heretofore described, is in operation, the remote-control mechanism RC is in the illustrated position, with the closed back-contact 51 in series with the tripping circuit of the trip-coil TC. If it should be desired to by-pass the capacitor 3, as for the purpose of isolating it from the line 4—5, for repairs or servicing, the remote-control device may be actuated to its other position, as by means of the handle 52, whereupon the trip-circuit is opened at 51, so that the breaker will not be automatically tripped, and the make-contact 50 of the remote-control switch RC will be closed to directly energize the closing-coil CC of the circuit-breaker 40. After the breaker 40 has been closed, it will be safe to close the disconnect-switch 6 which by-passes the entire series-capacitor equipment, after which the isolating disconnecting-switches 7 and 8 may be safely opened.

While we have illustrated our invention in two preferred forms of embodiment, we desire it to be understood that our invention, particularly in its broader aspects, is susceptible of embodiment in other forms of embodiment, with various substitutions, omissions and changes, such as will be obvious to those skilled in the art. We desire, therefore, that the appended claims shall be accorded the broadest construction consistent with their language and the prior art.

We claim as our invention:

1. A series-capacitor installation for an alternating-current line, comprising, in combination with said series capacitor, a protective gap-device connected in shunt-circuit relation to said series capacitor, means including an electrically controlled valve for supplying a blast of gas to said gap-device, and means responsive to an excessive current-flow through said gap-device for causing the valve to open at a time subsequent to the subsidence of the line-current.

2. A series-capacitor installation for an alternating-current line, comprising, in combination with said series capacitor, a protective gap-device connected in shunt-circuit relation to said series capacitor, means including an electrically controlled valve for supplying a blast of gas to said gap-device, and means responsive to current-flow through said gap-device and to a subsidence of the line-current to a predetermined value for causing the valve to open.

3. A series-capacitor installation for an alternating-current line, comprising, in combination with said series capacitor, a protective gap-device connected in shunt-circuit relation to said series capacitor, means including an electrically controlled valve for supplying a blast of gas to said gap-device, and time-delay means responsive to an excessive current-flow through said gap-device for causing the valve to open, the time-delay interposed by said time-delay means being sufficient to allow a reasonable time for the subsidence of the line-current.

4. A series-capacitor installation comprising, in combination with said series capacitor, a protective gap-device connected in shunt-circuit relation to said series capacitor, means including an electrically controlled valve for supplying a blast of gas to said gap-device, a normally substantially open-circuit auxiliary bypass-means in shunt-circuit relation to both the series capacitor and the protective gap-device, and means responsive to current-flow through said gap-device for initiating a train of events resulting first in an opening operation of the valve under certain circumstances and resulting subsequently in the establishment of a closed-circuit condition of said auxiliary bypass-means in the event of an imperfect operation of the protective-gap and gas-blast apparatus.

5. A series-capacitor installation comprising, in combination with said series capacitor, a protective gap-device connected in shunt-circuit relation to said series capacitor, means including an electrically controlled valve for supplying a blast of gas to said gap-device, a normally substantially open-circuit auxiliary bypass-means in shunt-circuit relation to both the series capacitor and the protective gap-device, means responsive to current-flow through said gap-device and to a subsidence of the line-current to a predetermined value for causing the valve to open, means responsive to current-flow through said gap-device for a predetermined time for establishing a closed-circuit condition of said auxiliary bypass-means, and means responsive to the last-named event and to a subsidence of the line-current to a predetermined value for substantially restoring the normal substantially open-circuit condition of the auxiliary bypass-means.

6. A series-capacitor installation comprising, in combination with said series capacitor, a protective gap-device connected in shunt-circuit relation to said series capacitor, means including an electrically controlled valve for supplying a blast of gas to said gap-device, a manually and automatically controllable circuit-interrupter means in shunt-circuit relation to both the series capacitor and the protective gap-device, means responsive to current-flow through said gap-device for causing the valve to open under certain conditions, to clear the arc from the gap-device, means responsive to a failure of the gap-clearing means to operate within a predetermined time for causing a circuit-making operation of said circuit-interrupter means, and means responsive to the last-named event for causing a circuit-interrupting operation of the circuit-interrupter means under certain conditions.

7. A series-capacitor installation comprising, in combination with said series capacitor, a protective gap-device connected in shunt-circuit relation to said series capacitor, means including an electrically controlled valve for supplying a blast of gas to said gap-device, and means responsive to current-flow through said gap-device for initiating a train of events resulting first in an opening operation of the valve under certain circumstances and means further responsive to current-flow through the gap-device for producing an effect resulting subsequently in closing a gap-shunting circuit for causing the series capacitor to be by-passed by a gap-free all-conductor circuit in the event of an imperfect operation of the protective-gap and gas-blast apparatus.

8. A series-capacitor installation comprising, in combination with said series capacitor, a protective gap-device connected in shunt-circuit relation to said series capacitor, means including an electrically controlled valve for supplying a blast of gas to said gap-device, means responsive to current-flow through said gap-device and to a subsidence of the line-current to a predetermined value for causing the valve to open, time-delay circuit-means operative after the establishment of current-flow through said gap-device for effecting a circuit-closing operation for causing the series capacitor to be by-passed by a gap-free all-conductor circuit in the event of an imperfect operation of the protective-gap and gas-blast apparatus, and means responsive to the last-named event and to a subsidence of the line-current to a predetermined value for performing a circuit-opening operation restoring the apparatus to its initial condition.

9. A series-capacitor installation comprising, in combination with said series capacitor, a protective gap-device connected in shunt-circuit relation to said series capacitor, means including an electrically controlled valve for supplying a blast of gas to said gap-device, a manually and automatically controllable circuit-closing means, means responsive substantially to an initiation of current-flow through said gap-device for causing the valve to open under certain conditions, to clear the arc from the gap-device, means responsive to a failure of the gap-clearing means to operate within a predetermined time for causing a circuit-making operation of said circuit-closing means in such manner as to cause the series capacitor to be by-passed by a gap-free all-conductor circuit, and means responsive to the last-named event for causing a circuit-interrupting operation of the circuit-closing means under certain conditions.

LEON R. LUDWIG.
CHARLES V. FIELDS.